United States Patent [19]

Ness et al.

[11] Patent Number: 5,120,452

[45] Date of Patent: * Jun. 9, 1992

[54] PROCESS FOR PURIFYING WASTEWATER WITH HYPOCHLOROUS ACID

[75] Inventors: Richard C. Ness, Cleveland; Budd L. Duncan, Athens; Sudhir K. Mendiratta, Cleveland; Donald R. Leonard, Athens, all of Tenn.

[73] Assignee: Olin Corporation, Cheshire, Conn.

[*] Notice: The portion of the term of this patent subsequent to Jun. 2, 2009 has been disclaimed.

[21] Appl. No.: 558,713

[22] Filed: Jul. 26, 1990

[51] Int. Cl.$^5$ ............................................. C02F 1/76
[52] U.S. Cl. ................................... 210/754; 210/721; 210/725; 210/756; 210/758; 210/764
[58] Field of Search ............... 210/631, 721, 725, 756, 210/758, 764, 754

[56] References Cited

U.S. PATENT DOCUMENTS

| | | | |
|---|---|---|---|
| 3,462,275 | 8/1969 | Bellamy | 210/631 |
| 3,730,881 | 5/1973 | Armstrong | 210/631 |
| 4,146,578 | 3/1979 | Brennan et al. | 423/473 |
| 4,147,761 | 4/1979 | Wojtowicz et al. | 423/473 |
| 4,693,832 | 9/1987 | Hurst | 210/756 |
| 4,769,154 | 9/1988 | Saylor et al. | 210/707 |

FOREIGN PATENT DOCUMENTS 50-57957  5/1975  Japan .................................. 210/756
05111    6/1990  PCT Int'l Appl. .

OTHER PUBLICATIONS

E. B. Besselievre "The Treatment of Industrial Wastes", N.Y., McGraw–Hill, 1969, pp. 58–60, 62–68.
G. C. White "The Handbook of Chlorination" 2nd ed. N.Y. Van Nostrand Reinhold, 1986 pp. 37–38, 64–66.

Primary Examiner—Stanley S. Silverman
Assistant Examiner—Thomas M. Lithgow
Attorney, Agent, or Firm—Allen A. Meyer, Jr.; Paul Weinstein

[57] ABSTRACT

A process for treating wastewater the improvement which comprises admixing with the wastewater at least 0.5 percent by weight of a solution consisting of hypochlorous acid having a pH of less than 3 to prepare disinfected wastewater having substantially no available chlorine residual.

The novel process of the present invention provides rapid, intimate mixing of the highly pure, highly acidic hypochlorous acid solution with the wastewater stream to disinfect wastewater bodies while minimizing unwanted side effects. The process eliminates the need for storing and handling pressurized gaseous or liquid chlorine.

6 Claims, 1 Drawing Sheet

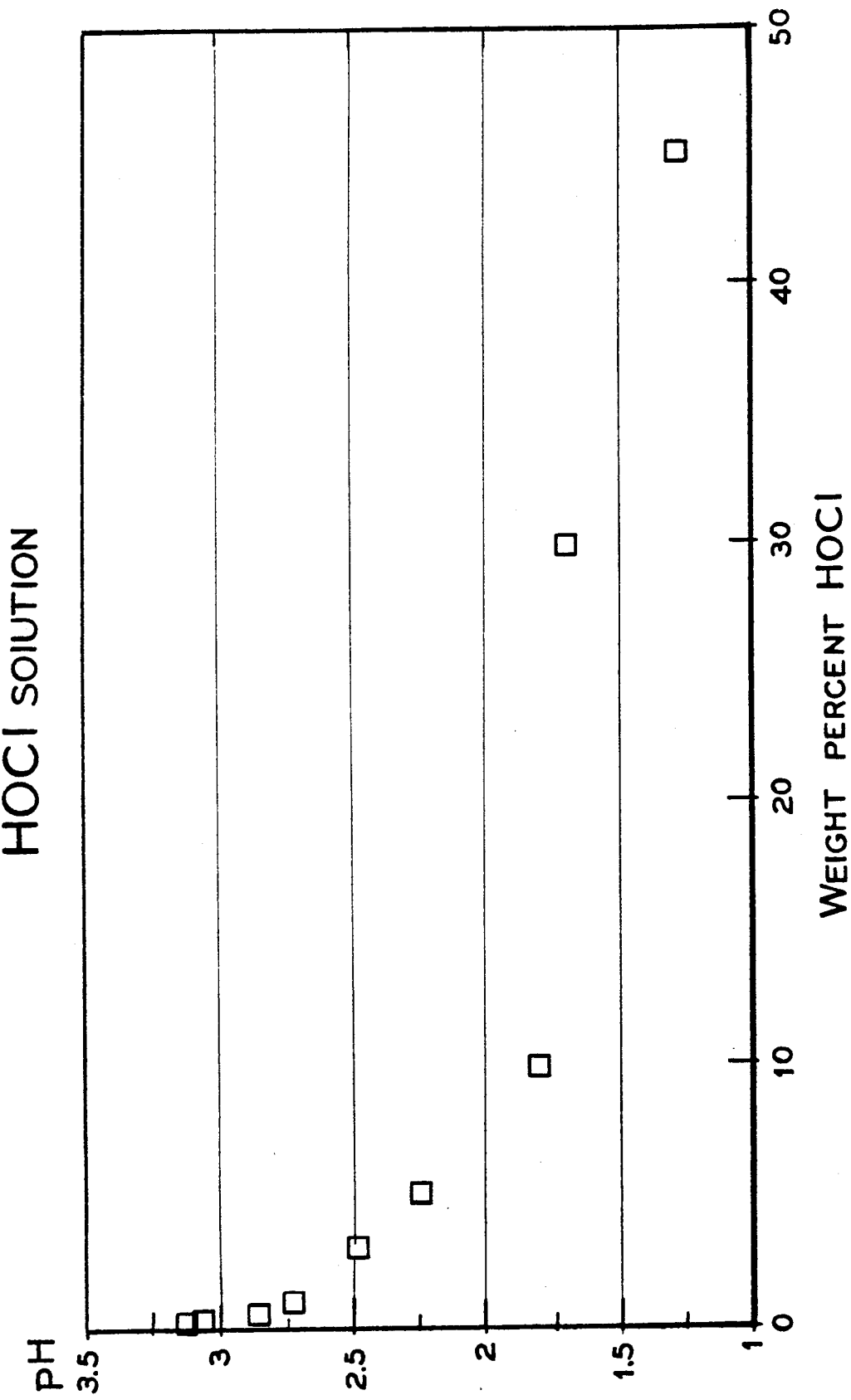

PROCESS FOR PURIFYING WASTEWATER WITH HYPOCHLOROUS ACID

BACKGROUND OF THE INVENTION

1. Field of the Invention

This invention relates to the purification of wastewater. More particularly, this invention relates to the purification of wastewater using hypochlorous acid.

2. Description of the Prior Art

For many years chlorine has been recognized as a good disinfectant and in one form or another has been involved in the majority of systems designed to treat water. In almost all modern water or sewage treatment plants, for example, chlorine is used to reduce the number of bacteria from the final effluent before it is discharged from the system to a potable water distribution system or into a river or stream. A chlorination plant or system may also provide for removing color, correcting tastes, eliminating odor and suppressing other types of undesirable biological growths. Chlorine is also widely used in the treatment of industrial wastes and waste waters.

The amount of chlorine added to the water is referred to as the "dosage" and is usually expressed as milligrams per liter (mg/l) or parts per million (ppm). The amount of chlorine used up or consumed by bacteria, algae, organic compounds and some inorganic substances, such as iron or manganese, is designated as the "demand".

Since many of the reactions with chlorine are not instantaneous, but require time to reach completion, chlorine demand is time-dependent. The amount of chlorine remaining in the water at the time of measurement is referred to as the "residual". Residual is therefore determined by the demand subtracted from the dosage. Inasmuch as chlorine demand is time-dependent, this dependency is likewise true of chlorine residual.

When chlorine dissolves in water, a mixture of hypochlorous and hydrochloric acid is formed. The hydrochloric acid always completely dissociates into hydrogen and chloride ions, whereas the hypochlorous acid only partially dissociates into hydrogen and hypochlorite ions as a function of the pH of the water. In either the hypochlorous or hypochlorite form, chlorine is called "free chlorine residual". Free chlorine residual has a highly effective killing power toward bacteria.

Should the chlorinated water contain ammonia or certain amino (nitrogen-based) compounds, as is invariably the case with sewage, then additional compounds called chloramines are created. Chloramines may occur almost instantaneously, depending mainly on water pH. Though several reactions are possible between hypochlorous acid and ammonia, chloramines collectively are referred to as "combined chlorine residual". This combined chlorine residual has a much lower bacterial effect than free chlorine residual.

Domestic wastewater is typically high in ammonia, the ammonia resulting primarily from hydrolysis of urea. Almost all of the inorganic nitrogen formed in solutions that enter a waste treatment plant is normally in the least oxidized, ammonia form. In conventional secondary waste treatment, a portion of the ammonia will be completely nitrified to nitrite, some ammonia will be only partially nitrified to nitrite, and a portion will remain as ammonia.

When sufficiently high chlorine dosages are applied to waters containing ammonia, different reactions will occur, resulting in the destruction of the ammonia and the formation of free chlorine residual. Thus, for water containing a known amount of ammonia, if one starts with a chlorine dosage which is low, chloramines will be formed resulting in a combined chlorine residual whose bacterial effect is relatively weak.

As the dosage is raised, the amount of combined chlorine residual produced also increases, until a peak is reached when all of the free ammonia is used up in the formation of chloramine. As the dosage is elevated beyond the level at which the combined chlorine residual peaks, destruction of the chloramines, which are unstable, takes place until a breakpoint is reached indicating that chloramine destruction is at its maximum. At breakpoint, the first persistent appearance of free chlorine occurs. Thus, by using a chlorine dosage sufficient to attain the breakpoint state, one is able to get rid of virtually all ammonia and most of the chloramines.

Many applications exist for chlorine in wastewater treatment facilities, such as for odor control of raw sewage and the control of hydrogen sulfide in sewers, but its most universal application lies in wastewater treatment facilities for the terminal disinfection of the treated plant effluent just before the effluent is discharged.

The formation of compounds suspected of being carcinogenic as a result of the reaction of chlorine with hydrocarbons in wastewater is by no means the only unwanted side effect caused by the traditional disinfection process, for chlorine residuals in wastewater give rise to an environment that is toxic to aquatic organisms. Though chlorine is a highly effective biocide for undesirable organism, it is also deadly to fish and other forms of aquatic life and therefore, has a deleterious impact on fresh water eco-systems.

In general, wastewater disinfection practice has heretofore largely disregarded these unwanted side effects, for this practice focused on the two factors thought to be of greatest significance in attaining adequate disinfection; namely, the residual of the disinfectant and its contact time with the sewage. This practice has brought about the use of massive doses of chlorine disinfectant in long serpentine channel serving to prolong contact time. While this produced the desired degree of disinfection, it also aggravated unwanted side effects.

In order to obtain adequate disinfection with minimal unwanted side effects, the now recognized goal is to carry out rapid, intimate mixing of the chlorine solution with the wastewater stream in the shortest possible period.

In treating water, the equipment which supplies $Cl_2$ gas to water operates at partial pressures (vacuum). At the vacuum levels currently being used the maximum solubility is about 5000 mg/l. The upper limit of solubility recommended by all chlorinator manufacturers is 3500 mg/l.

U.S. Pat. No. 4,693,832, issued Sep. 15, 1987 to M. M. Hurst, describes a method of preparing potable water by mixing into semi-finished water an aqueous solution of hypochlorous acid having a pH of between about 3 and about 6 in amounts which provide the water with a free chlorine residual of at least about 0.5 ppm. The aqueous solutions contain between 0.1 and 10 grams of HOCl per liter. The method employs dilute solutions of impure hypochlorous acid having high pH values. These HOCl solutions are stated to provide the water with free available chlorine residuals having improved stability. However, to obtain the required pH range it is necessary to supply a base to the hypochlorous acid solution or employ a method of preparation which will prepare hypochlorous acid solutions having the desired pH.

SUMMARY OF THE INVENTION

It is an object of the present invention to provide a process for treating wastewater in which the dispersion of the chlorinating agent is both simplified and expedited.

It is an added object of the present invention to provide a process for treating wastewater which eliminates the need for handling pressurized gaseous or liquid chlorine.

These and other advantages are accomplished in a process for treating wastewater the improvement which comprises admixing with the wastewater at least 0.5 percent by weight of a solution consisting of hypochlorous acid having a pH of less than 3 to prepare disinfected wastewater.

BRIEF DESCRIPTION OF THE DRAWINGS

More in detail, the novel process of the present invention employs highly pure, highly acidic hypochlorous acid solutions. The FIGURE graphically depicts the pH of HOCl solutions having concentrations in the range of 0.1 to 45 weight percent of HOCl.

DETAILED DESCRIPTION OF THE INVENTION

The novel process of the present invention employs as the chlorinating agent a concentrated solution of high purity hypochlorous acid, HOCl. One method of producing high purity concentrated HOCl solutions is that in which gaseous mixtures, having high concentrations of hypochlorous acid vapors and chlorine monoxide gas and controlled amounts of water vapor are produced, for example, by the process described by J. P. Brennan et al in U.S. Pat. No. 4,147,761, which is incorporated herein its entirety by reference. The gaseous mixture is then converted to a concentrated hypochlorous acid solution as described in WO 90/05111 published May 17, 1990 by J. K. Melton, et. al. which is also incorporated herein in its entirety by reference.

The concentrated hypochlorous acid solution employed as a reactant contains from about 0.5 to about 60 percent by weight of HOCl. Preferred solutions are those having concentrations in the range of from about 1 to about 45, and more preferably from about 5 to about 15 percent by weight of HOCl.

The solution is substantially free of ionic impurities such as chloride ions and alkali metal ions and has low concentrations of dissolved chlorine. For example, concentrations of the chloride ion are preferably less than about 50 parts per million and the alkali metal ion concentration is preferably less than about 50 parts per million. The dissolved chlorine concentration in the hypochlorous acid solution is normally less than about 2 percent, and preferably less than about 1 percent by weight. The pH of dilute highly pure HOCl solutions is less than 3, and as the concentration of HOCl increases, the pH is reduced, thus for highly concentrated solutions the pH falls below 0, i.e. the solutions cannot be adequately described by a pH designation.

In the purification of wastewater, the initial step in the treatment process, after the removal of insoluble solids, is often the removal of dissolved solids. Depending on the volume of wastewater of be treated, various methods including ion exchange, reverse osmosis, pH adjustment, aeration, and biological oxidation, among others, can be used separately or in combination. One of the most common ways to convert soluble organic solids to insoluble solids is through biological oxidation. Soluble organics metabolized by bacteria are converted to carbon dioxide and bacterial floc which can be settled from solution. To maintain the waste in a fresh condition and to prevent septicity, in the novel process of the present invention, a pre-disinfection dose of the highly acidic hypochlorous acid solution having a pH of less than 3 is employed. The addition of the hypochlorous acid solution to maintain fresh waste prior to sedimentation or clarification results in improved settling rates of the insoluble organic solids and eliminates septicity in settled sludge thereby preventing it from rising in the clarifier or settler. As the use of hypochlorous acid reduces the amount of chloride formed in the solution over the use of chlorine by 50 percent, any possible interference in the digestion step by the presence of chlorides should be substantially reduced.

Where the presence of filimentous bacteria is sufficient to cause sludge bulking, poor settling in the clarifier or settler, for the activated sludge produced during biological oxidation, the addition of the highly acidic hypochlorous acid solution kills the filimentous bacteria and eliminates sludge bulking. The dose of hypochlorous acid used to prevent sludge bulking in a wastewater treatment process where the activated sludge is recycled varies with an average amount being about 5 mg/l based on the return sludge flow. Higher or lower doses may be employed.

After the dissolved solid particles in the wastewater have been removed, the wastewater filtrate is then subjected to a disinfection treatment by admixing the solution consisting of hypochlorous acid having a pH of less than 3. The highly acidic hypochlorous acid solution may be added directly to the wastewater as it readily mixes with the wastewater to kill the pathogens present and produce a disinfected water supply. Further, in wastewater treatment plants which introduce chlorine gas into a stream of water to provide adequate mixing prior to addition to the body of wastewater, the hypochlorous acid solution may also be fed to this carrier stream. Sufficient amounts of the acidic hypochlorous acid solution are added to kill the pathogens present and produce a disinfected wastewater supply without providing the wastewater with a significant clorine residual. Hypochlorous acid has the highest oxidation potential of chlorine-containing disinfecting agents, i.e. $E^o = 1.440$ volts vs 1.395 for $Cl_2$ and 1.120 for NaOCl. This allows the use of lesser amounts of HOCl to achieve equivalent disinfecting action. Disinfecting amounts of the acidic hypochlorous acid solution are related to the nature and concentration of the pollutants. Suitable amounts include those which provide the wastewater with from about 1 to about 50 mg/l, and preferably with from about 10 to about 30 mg/l. The disinfected waste water has substantially no residual available chlorine or is treated with a reducing agent such as hydrogen peroxide or a sulfite compound, i.e. bisulfite or thiosulfate to remove any residual available chlorine. The treated wastewater is suitable for use in an industrial process or for discharge in a navigable waterway.

The novel process of the present invention provides rapid, intimate mixing of the highly pure, highly acidic hypochlorous acid solution with the wastewater stream to disinfect wastewater bodies while minimizing unwanted side effects. The process eliminates the need for storing and handling pressurized gaseous or liquid chlorine.

What is claimed is:

1. In a process for treating wastewater the improvement which comprises admixing with the wastewater at least 0.5 percent by weight of a solution consisting of hypochlorous acid substantially free of ionic impurities having a pH of less than 3 to prepare disinfected wastewater having substantially no available chlorine residual.

2. The process of claim 1 in which the concentration of hypochlorous acid is from about 1 to about 45 by weight of HOCl.

3. The process of claim 1 in which the hypochlorous acid has a dissolved chlorine concentration of less than about 2 percent by weight.

4. A process for sanitizing wastewater containing dissolved solids which comprises admixing with the wastewater a preliminary dose of a first solution consisting of hypochlorous acid, substantially free of ionic impurities, having a pH of less than 3 to form a pre-disinfected wastewater, admixing a biological oxidation agent with the pre-disinfected wastewater to remove dissolved solids, and admixing with the wastewater a sanitizing amount of a second solution consisting of hypochlorous acid, substantially free of ionic impurities, having a pH of less than 3 to prepare disinfected wastewater having substantially no available chlorine residual.

5. The process of claim 4 in which the pre-disinfected water is clarified prior to sanitization.

6. The process of claim 5 in which the second solution has a concentration of hypochlorous acid of from about 1 to about 45 by weight of HOCl.

* * * * *